(12) United States Patent
Ma et al.

(10) Patent No.: US 12,093,034 B2
(45) Date of Patent: Sep. 17, 2024

(54) CONTROL APPARATUS AND NETWORK CONTROL METHOD

(71) Applicant: Telexistence Inc., Tokyo (JP)

(72) Inventors: Li Ma, Tokyo (JP); Charith Lasantha Fernando, Tokyo (JP)

(73) Assignee: TELEXISTENCE INC., Tokyo (JP)

( * ) Notice: Subject to any disclaimer, the term of this patent is extended or adjusted under 35 U.S.C. 154(b) by 421 days.

(21) Appl. No.: 17/491,879

(22) Filed: Oct. 1, 2021

(65) Prior Publication Data

US 2022/0019216 A1 Jan. 20, 2022

Related U.S. Application Data

(63) Continuation of application No. PCT/JP2020/015027, filed on Apr. 1, 2020.

(30) Foreign Application Priority Data

Apr. 3, 2019 (JP) ................................ 2019-070968

(51) Int. Cl.
*G05D 1/00* (2024.01)
*H04L 45/12* (2022.01)
*H04L 45/586* (2022.01)

(52) U.S. Cl.
CPC ......... *G05D 1/0022* (2013.01); *H04L 45/124* (2013.01); *H04L 45/586* (2013.01)

(58) Field of Classification Search
CPC .... G05D 1/0022; H04L 45/124; H04L 45/586
See application file for complete search history.

(56) References Cited

U.S. PATENT DOCUMENTS 9,042,234 B1 5/2015 Liljenstolpe et al.
2013/0166621 A1 6/2013 Zhu
(Continued)

FOREIGN PATENT DOCUMENTS

CN 101973031 A 2/2011
CN 104794214 A 7/2015
(Continued)

OTHER PUBLICATIONS

European Search Report dated Apr. 20, 2022, 3 pages.
(Continued)

*Primary Examiner* — Jaime Figueroa
*Assistant Examiner* — Jamal A Shah
(74) *Attorney, Agent, or Firm* — Rankin, Hill & Clark LLP

(57) ABSTRACT

In a control apparatus that controls communication of a telexistence system including a slave robot and an operating device, a state acquisition part repeatedly acquires status reports respectively from the operating device, the slave robot, and a plurality of virtual routers that connect the operating device and the slave robot while communication between the operating device and the slave robot is established. A path determination part determines a communication path for transmitting a control instruction for controlling the motion of the slave robot to the slave robot on the basis of the acquired status reports when the state acquisition part acquires the status reports. An instruction transmitting part transmits an instruction for forming the communication path determined by the path determination part to each of the plurality of virtual routers.

8 Claims, 10 Drawing Sheets

(56) References Cited

U.S. PATENT DOCUMENTS

2015/0281100 A1   10/2015   Kurita
2018/0276608 A1*   9/2018   Stadie .............. G05B 19/41895
2020/0078950 A1   3/2020   Fernando et al.

FOREIGN PATENT DOCUMENTS

| | | |
|---|---|---|
| CN | 106358256 A | 1/2017 |
| JP | 2012-175418 | 9/2012 |
| JP | 2015-188186 | 10/2015 |
| JP | 2016-192732 A | 11/2016 |
| JP | 2017-022548 | 1/2017 |
| WO | 2018/212225 | 11/2018 |

OTHER PUBLICATIONS

Martinez, et al., "Ultra Reliable Communication for Robot Mobility Enabled by SDN Splitting of WiFi Functions", 2018 IEEE Symposium of Computers and Communications, Jun. 25, 2018, pp. 527-530, 4 pages.

Rutvij, et al., "Real-Time QoS Routing Scheme in SCN-Based Robotic Cyber-Physical Systems", 2019 IEEE 5th International Conference on Mechatronics System and Robots, May 3, 2019, 6 pages.

Gao, et al., "Congestion-Aware Multicast Plug-In for an SDN Network Operating System", Computer Networks, vol. 125, Oct. 9, 2017, pp. 53-63, 11 pages.

Tadatoshi Kurogi et al., "Haptic Transmission System to Recognize Differences in Surface Textures of Objects for Telexistence", IEEE Virtual Reality 2013, pp. 137-138, English text, 2 pages.

Toshiya Takakura et al., "Study on Telexistence (LXXXVI): Required features for Telexistence system over the Internet", The 21st Annual Conference of the Virtual Reality Society of Japan, Sep. 14, 2016, p. 11F-03, English translation included, 12 pages.

International Search Report, Date of mailing: Jun. 30, 2020, 3 pages.

* cited by examiner

| Status when executing | Statistic |
|---|---|
| bandwidth | Maximum, minimum, average |
| latency | Maximum, minimum, average |
| jitter | Maximum, minimum, average |
| Packet loss rate | Maximum, minimum, average |
| Packet rearrangement rate | Maximum, minimum, average |
| Error correction rate | Maximum, minimum, average |

FIG. 5

| Operation scenario A | Weighting factor |
|---|---|
| bandwidth | Wb |
| latency | Wr |
| jitter | Wj |
| Packet loss rate | Wl |
| Packet rearrangement rate | Wo |
| Error correction rate | Wc |

FIG. 6

CONTROL APPARATUS AND NETWORK CONTROL METHOD

CROSS-REFERENCE TO RELATED APPLICATIONS

The present application is a continuation application of International Application number PCT/JP2020/015027, filed on Apr. 1, 2020, which claims priority under 35 U.S.C § 119(a) to Japanese Patent Application No. 2019-070968, filed on Apr. 3, 2019. The contents of this application are incorporated herein by reference in their entirety.

BACKGROUND

Technical Field

The present disclosure relates to a control apparatus, a network control method, and a program, particularly, to control technology of a communication network between a slave robot and an operating device in a telexistence system.

Telexistence is a technique for allowing an operator who remotely controls a slave robot located away from the operator to experience sensations such as vision, hearing, and touch that would be acquired if the operator were in a place where he/she is not actually present. Such a technique is disclosed in "T. Kurogi, M. Nakayama, K. Sato, S. Kamuro, C. L. Fernando, M. Furukawa, K. Minamizawa, and S. Tachi," Haptic Transmission System to Recognize Differences in Surface Textures of Objects for Telexistence ", IEEE Virtual Reality 2013, pp. 137-138.", for example. It should be noted that the slave robot may be referred to as a surrogate because the slave robot meets a person or works instead of the operator at a remote location away from the operator.

In telexistence, a remote slave robot is operated in real time using an operating device called a cockpit. In order to do so, it is necessary to transmit and receive video, audio, tactile information, operation instructions, and the like between the operating device and the robot without delay.

Various technologies for doing peer-to-peer communication in real time via an existing network such as the Internet have been proposed. Among such technologies, there is Web RTC (Web Real-Time Communication) technology for exchanging audio and video in real time between peers using a web browser, for example.

In technology such as WebRTC, once a communication path is established between two web browsers, the communication path is fixed. Real-time communication is assured by changing a bit rate and a data amount (e.g., resolution of video) of data exchanged between web browsers in accordance with a traffic amount, bandwidth, and the like in the communication path.

In telexistence, the operator controls a slave robot located at a remote location on the basis of streaming data such as audio, video, and tactile information transmitted from the slave robot. As a result, if the resolution of the video is changed while the slave robot is being operated, the operation of the slave robot may be affected, for example. Therefore, there is a demand for a technique for performing communication while values of specific items to be prioritized in the operation of a telexistence system are maintained at predetermined values or more.

SUMMARY

The present disclosure focuses on these points, and an object of the present disclosure is to provide a technique allowing communication while values of specific items are maintained at predetermined values or more in the operation of the telexistence system.

The first aspect of the present disclosure is a control apparatus for controlling communication between an operating device and one or a plurality of slave robots in a telexistence system including the one or the plurality of slave robots, one operating device for controlling the motion of the one or the plurality of slave robots, and a plurality of virtual routers for forming a communication path for transmitting information between the operating device and the one or the plurality of slave robots. This apparatus includes a state acquisition part that repeatedly acquires status reports respectively from the operating device, the one or the plurality of slave robots, and the plurality of virtual routers while communication between the operating device and the one or the plurality of slave robots is established, a path determination part that determines a communication path for transmitting a control instruction for controlling the motion of the slave robot to the one or the plurality of slave robots on the basis of the acquired status reports when the state acquisition part acquires the status reports, and an instruction transmitting part that transmits an instruction for forming a communication path determined by the path determination part to each of the plurality of virtual routers.

The second aspect of the present disclosure is a control apparatus for controlling communication between a plurality of operating devices and one slave robot in a telexistence system including the plurality of operating devices, the slave robot whose motion is controlled by any one of the plurality of operating devices, and a plurality of virtual routers for forming a communication path for transmitting information between the plurality of the operating devices and the slave robot. This apparatus includes a priority operating device acquisition part that acquires priority operating device information for identifying a priority operating device which is an operating device for controlling the motion of the slave robot, from among the plurality of operating devices, a state acquisition part that repeatedly acquires status reports respectively from the plurality of operating devices, the slave robot, and the plurality of virtual routers while communication between the plurality of operating devices and the slave robot is established, a path determination part that determines a communication path for transmitting a control instruction for controlling the motion of the slave robot to the slave robot on the basis of the acquired status reports and the priority operating device information when the state acquisition part acquires the status reports, and an instruction transmitting part that transmits an instruction for forming a communication path determined by the path determination part to each of the plurality of virtual routers.

The third aspect of the present disclosure is a network control method performed by a processor of a control apparatus that controls communication between one operating device and one or a plurality of slave robots in a telexistence system including the one or the plurality of slave robots, the operating device for controlling the motion of the one or the plurality of slave robots, and a plurality of virtual routers for forming a communication path for transmitting information between the operating device and the one or the plurality of slave robots. In this method, the processor performs repeatedly acquiring status reports respectively from the operating device, the one or the plurality of slave robots, and the plurality of virtual routers while communication between the operating device and the one or the plurality of slave robots is established, determining a communication path for transmitting a control instruction for controlling the motion of the slave robot to the one or the plurality of slave robots on the basis of the acquired status reports when acquiring the status reports, and transmitting an instruction for forming the determined communication path to each of the plurality of virtual routers.

The fourth aspect of the present disclosure is a network control method performed by a processor of a control apparatus that controls communication between a plurality of operating devices and one slave robot in a telexistence system including the plurality of operating devices, the slave robot whose motion is controlled by any one of the plurality of operating devices, and a plurality of virtual routers for forming a communication path for transmitting information between the plurality of operating devices and the slave robot. In this method, the processor performs acquiring priority operating device information that identifies a priority operating device, which is an operating device for controlling the motion of the slave robot, from among the plurality of operating devices, repeatedly acquiring status reports respectively from the plurality of operating devices, the slave robots, and the plurality of virtual routers while communication between the plurality of operating devices and the slave robot is established, determining a communication path for transmitting a control instruction for controlling the motion of the slave robot to the slave robot on the basis of the acquired status reports and the priority operating device information when acquiring the status reports, and transmitting an instruction for forming the determined communication path to each of the plurality of virtual routers.

It should be noted that any combination of the above constituent elements, the expression of the present disclosure converted between a method, an apparatus, a system, a computer program, a data structure, a recording medium, and the like, is also effective as an embodiment of the present disclosure.

BRIEF DESCRIPTION OF THE DRAWINGS

FIG. 5 shows a list of statistics acquired by a state acquisition part according to the first embodiment.

FIG. 6 schematically shows a data structure of a weighting factor database that stores scenario information and a weighting factor in association with each other.

DETAILED DESCRIPTION

Hereinafter, the present disclosure will be described through exemplary embodiments, but the following exemplary embodiments do not limit the invention according to the claims, and not all of the combinations of features described in the exemplary embodiments are necessarily essential to the solution means of the invention.

<An Outline of a Telexistence System>

Figure 1:
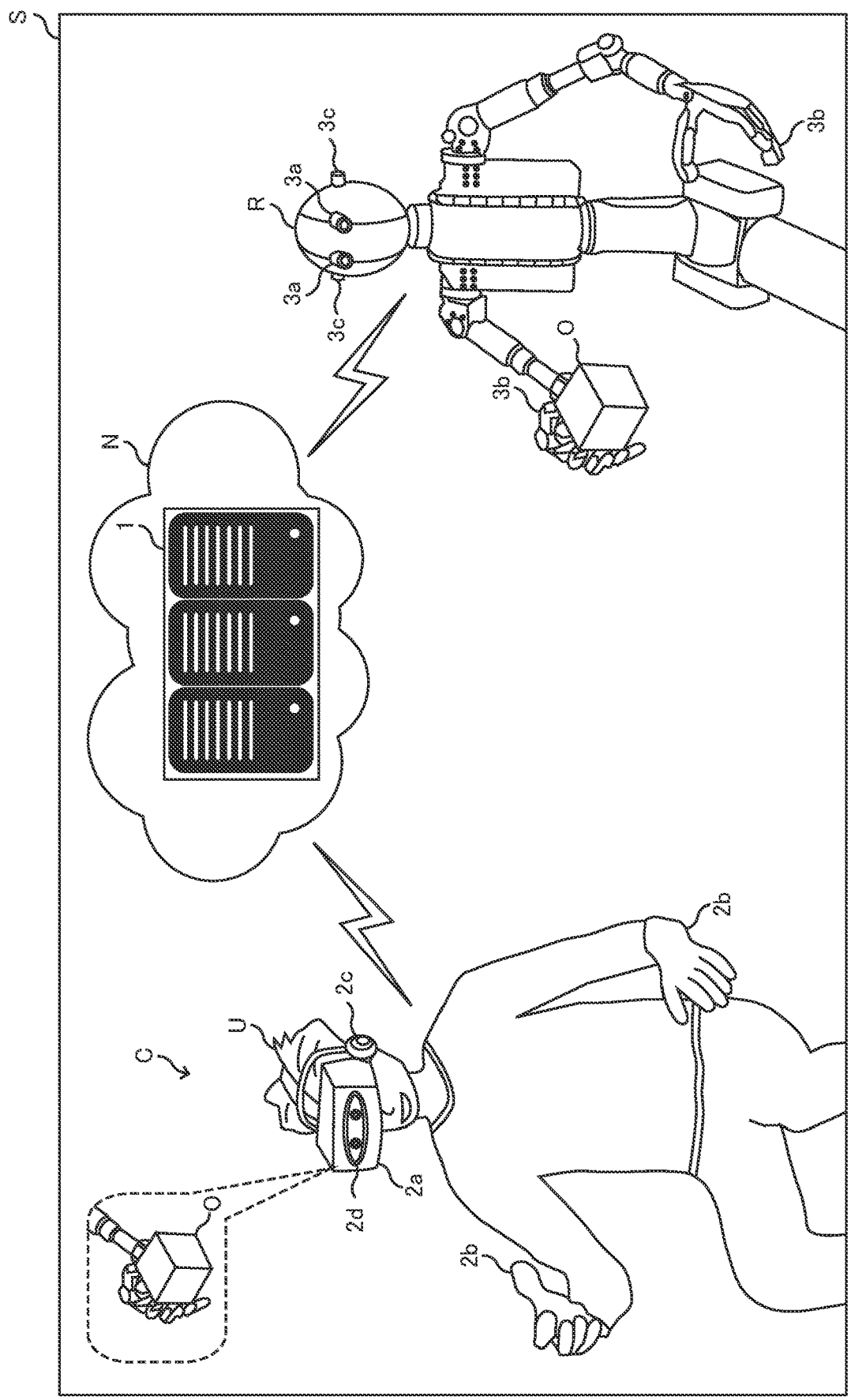
FIG. 1 schematically shows an appearance of components of a telexistence system.
Figure 2:
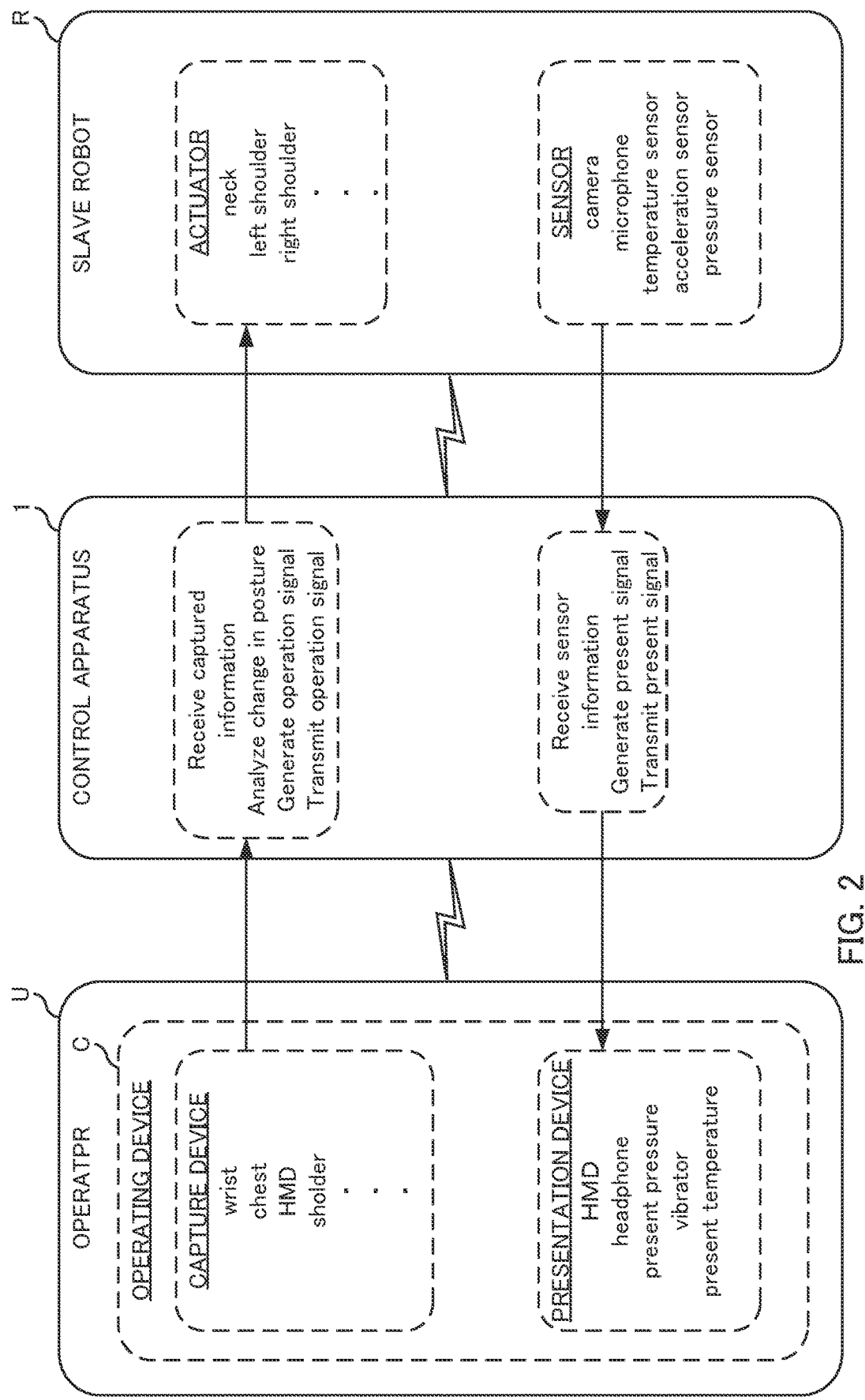
FIG. 2 schematically shows the components of the telexistence system and a flow of information exchanged between the components.

FIG. 1 schematically shows an appearance of components of a telexistence system S. Further, FIG. 2 schematically shows the components of the telexistence system and a flow of information exchanged between the components. Hereinafter, an outline of the telexistence system S that is a prerequisite of the present embodiment will be first described while referencing FIGS. 1 and 2.

The telexistence system S includes an operating device C, a slave robot R, and a control apparatus 1 that controls a flow of information between the operating device C and the slave robot R. In general, a place where the operating device C is located is far away from a place where the slave robot R is located. As shown in FIG. 1, an operator U utilizing the telexistence system S wears various presentation devices 2 (a head-mounted display 2a, tactile presentation devices 2b, a headphone 2c, and an imaging element 2d). Motion of the operator U's body is tracked by a capture device (not shown in figures), and transmitted to the control apparatus 1 as capture information indicating the posture of the operator U's body.

A slave robot R is provided with various sensors 3 (imaging elements 3a, tactile sensors 3b, and microphones 3c), and sensor information acquired by the respective sensors 3 is transmitted to the control apparatus 1. It should be noted that the tactile sensor 3b includes a temperature sensor 31, an acceleration sensor 32, and a pressure sensor 33.

As shown in FIG. 1, the slave robot R is a machine made in imitation of a form of a human. Therefore, the imaging element 3a is disposed at a position corresponding to an eye of the slave robot R. Likewise, the tactile sensor 3b is disposed at a position corresponding to a fingertip of the slave robot R, and the microphone 3c is disposed at a position corresponding to an ear of the slave robot R.

The control apparatus 1 is a cloud server existing on a communication network N. As shown in FIG. 2, the control apparatus 1 analyzes a change in the posture of the operator U on the basis of the capture information. The control apparatus 1 generates an operation signal for operating the slave robot R on the basis of the change in the posture of the operator U, and transmits said signal to the slave robot R. The slave robot R is equipped with an actuator in each part of the neck, shoulder, elbow, and the like, and the operation signal generated by the control apparatus 1 is a signal for operating these actuators. This allows the slave robot R to move in conjunction with the change in the posture of the operator U.

In the sense that the operator U changes his/her posture on the basis of information presented on the presentation device 2 and operates the slave robot R on the basis of this information, the presentation device 2 and the capture device in the telexistence system S function as the operating device C of the slave robot R as shown in FIG. 2. Although not shown in figures, the capture device may be provided with a camera for capturing the operator U wearing the presentation device 2. In this case, although the capture device is provided at a position away from the operator U, using the operating device C by the operator U may be described as "the operator U wears the operating device C" for convenience of explanation.

The control apparatus 1 generates a presentation signal for operating the presentation device 2 worn by the operator U on the basis of the sensor information acquired from the sensor 3 provided to the slave robot R and transmits said signal to the presentation device 2. For example, image information acquired by the imaging element 3a is streamed to the head-mounted display 2a via the communication network N and the control apparatus 1. Thus, the operator U can see video captured by the imaging element 3a that is the "eye" of the slave robot R through a monitor of the head-mounted display 2a. FIG. 1 shows a state in which the monitor of the head-mounted display 2a displays a right hand of the slave robot R and a cube that is a contact object O held by the right hand of the slave robot R.

Similarly, tactile information including temperature, vibration, and pressure acquired by the tactile sensor 3b is converted into a tactile presentation signal for operating the tactile presentation device 2b by the control apparatus 1. Thus, the operator U can feel the tactile sensation captured by the "fingertip" of the slave robot R through the tactile presentation device 2b.

In the telexistence system S according to the embodiment, the head-mounted display 2a is a shielded head-mounted display. Therefore, the operator U observing the video captured by the imaging element 3a via the head-mounted display 2a can acquire an immersive feeling as if the operator U were in the location of the slave robot R.

On the other hand, once the operator U wears the head-mounted display 2a, the operator U cannot see his/her surroundings. Since the head-mounted display 2a also operates as a part of a capture device, the operator U needs to wear the head-mounted display 2a before synchronizing the motion of the slave robot R with the motion of the operator U. Since the operator U wears the head-mounted display 2a before the image signal is transmitted from the control apparatus 1 to the head-mounted display 2a, it is inconvenient for the operator U to not be able to see his/her surroundings until the synchronization between the motion of the operator U and the motion of the slave robot R is started.

Therefore, as shown in FIG. 1, the head-mounted display 2a includes the imaging element 2d for capturing a line-of-sight direction of the operator U when worn by the operator U. This allows the operator U to observe his/her surroundings while wearing the head mounted-display 2a.

As described above, the slave robot R moves in conjunction with the change in the posture of the operator U and includes a group of sensors that acquires the signal for operating the presentation device 2 worn by the operator U. Using the telexistence system S according to the embodiment allows the operator U to experience sensations such as vision, hearing, and touch that would be acquired if the operator were in a place where he/she is not actually present but the slave robot R is.

<An Outline of the Telexistence System S According to a First Embodiment>

The above describes a case where there are only one operating device C and one slave robot R each in the telexistence system S. On the other hand, in the telexistence system S according to the first embodiment, there are a single operating device C and one or a plurality of slave robots R. The telexistence system S according to the first embodiment is a system used when one operator U controls a plurality of slave robots R using one operating device C.

Figure 3:
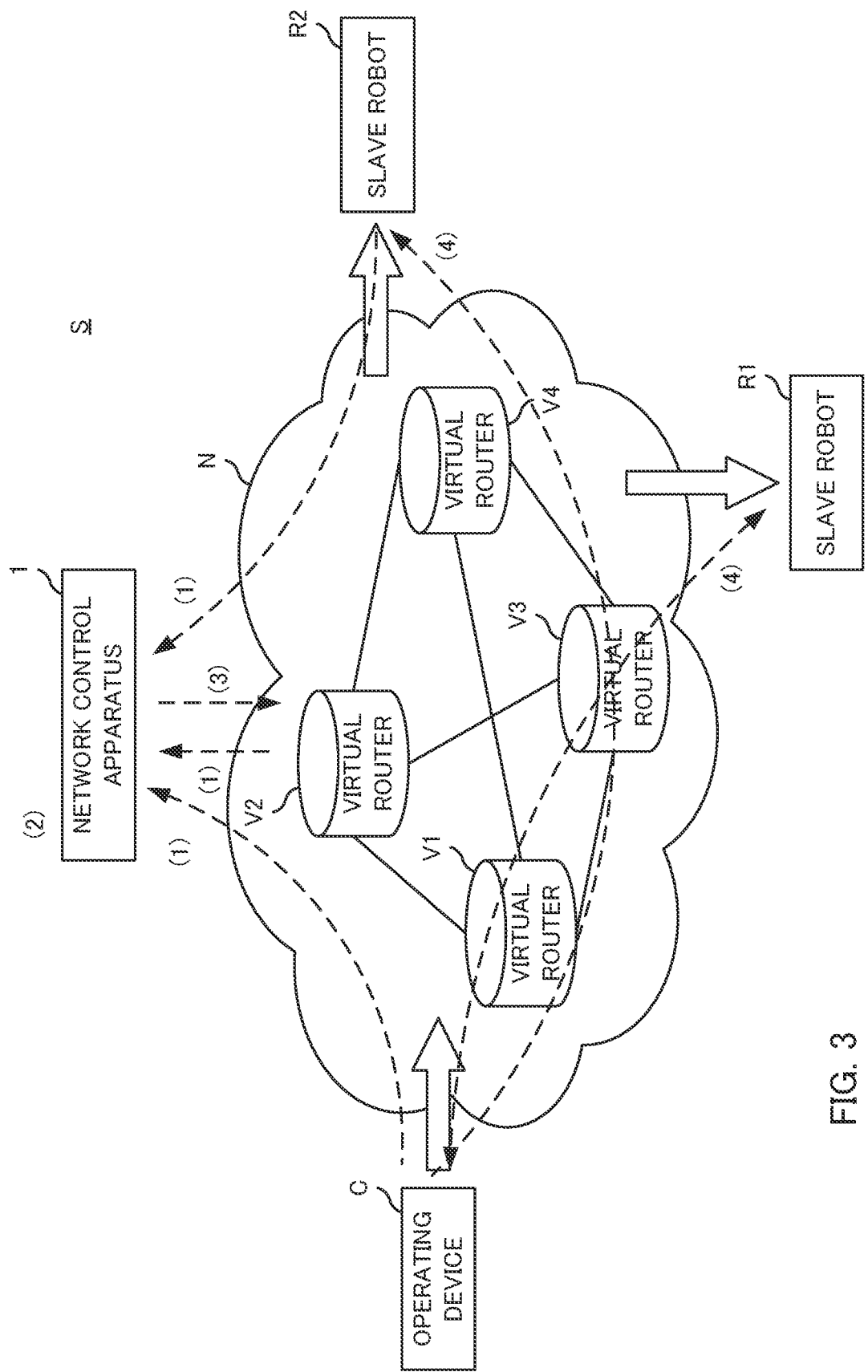
FIG. 3 is for explaining an outline of the telexistence system according to a first embodiment.

FIG. 3 is for explaining an outline of the telexistence system S according to the first embodiment. The telexistence system S shown in FIG. 3 includes a plurality of slave robots R, one operating device C for controlling the motion of the plurality of slave robots R, and a plurality of virtual routers V for forming a communication path for transmitting information between the operating device C and the plurality of slave robots R. It should be noted that FIG. 3 shows only two slave robots R (a first slave robot R1 and a second slave robot R2) for convenience of illustration, but the number of slave robots R may be one or three or more. Similarly, although FIG. 3 shows four virtual routers V (a first virtual router V1, a second virtual router V2, a third virtual router V3, and a fourth virtual router V4), the number of virtual routers V is not limited to four.

The control apparatus 1 controls communication between the operating device C and the plurality of slave robots R. A detailed description of a known technique is omitted, but the virtual router V is a technique for virtually realizing a routing function. The virtual router V is configured such that the control apparatus 1 can control a transfer destination of data with a virtualized function of a network switch. Therefore, even after a communication path is established between the operating device C and the slave robot R by some virtual routers V, the virtual routers V forming the communication path between the operating device C and the slave robot R can be changed afterward. The control apparatus 1 controls the communication between the operating device C and the plurality of slave robots R by controlling the operation of the virtual router V.

For example, suppose that after the communication path is established between the operating device C and the slave robot R by the virtual router V, communication quality of the communication path is impaired for some reason. In this case, the control apparatus 1 changes the communication path by controlling the virtual router V to improve the communication quality between the operating device C and the slave robot R. As another example, when the operator U transmits, to the control apparatus 1, an instruction indicating transition from a state of operating two slave robots R at the same time, that is, a state where (i) the communication path between the operating device C and the first slave robot R1 and (ii) the communication path between the operating device C and the second slave robot R2 are established at the same time, to a state of operating only the first slave robot R1, the control apparatus 1 controls the virtual router V to cut off the communication path between the operating device C and the second slave robot R2.

As described above, the control apparatus 1 dynamically changes the communication path between the operating device C and the slave robot R by controlling the virtual router V in the telexistence system S according to the first embodiment. As a result, the operating device C and the slave robot R in the telexistence system S can communicate with each other while maintaining values of specific items such as a bit rate of streaming data, a bit rate of data, and a data amount at predetermined values or more. Further, the operator U can freely change the slave robot R to be operated using the operating device C among the plurality of slave robots R in accordance with a task to be executed by operating the slave robot R.

<A Functional Configuration of the Control Apparatus 1 According to the First Embodiment>

Figure 4:
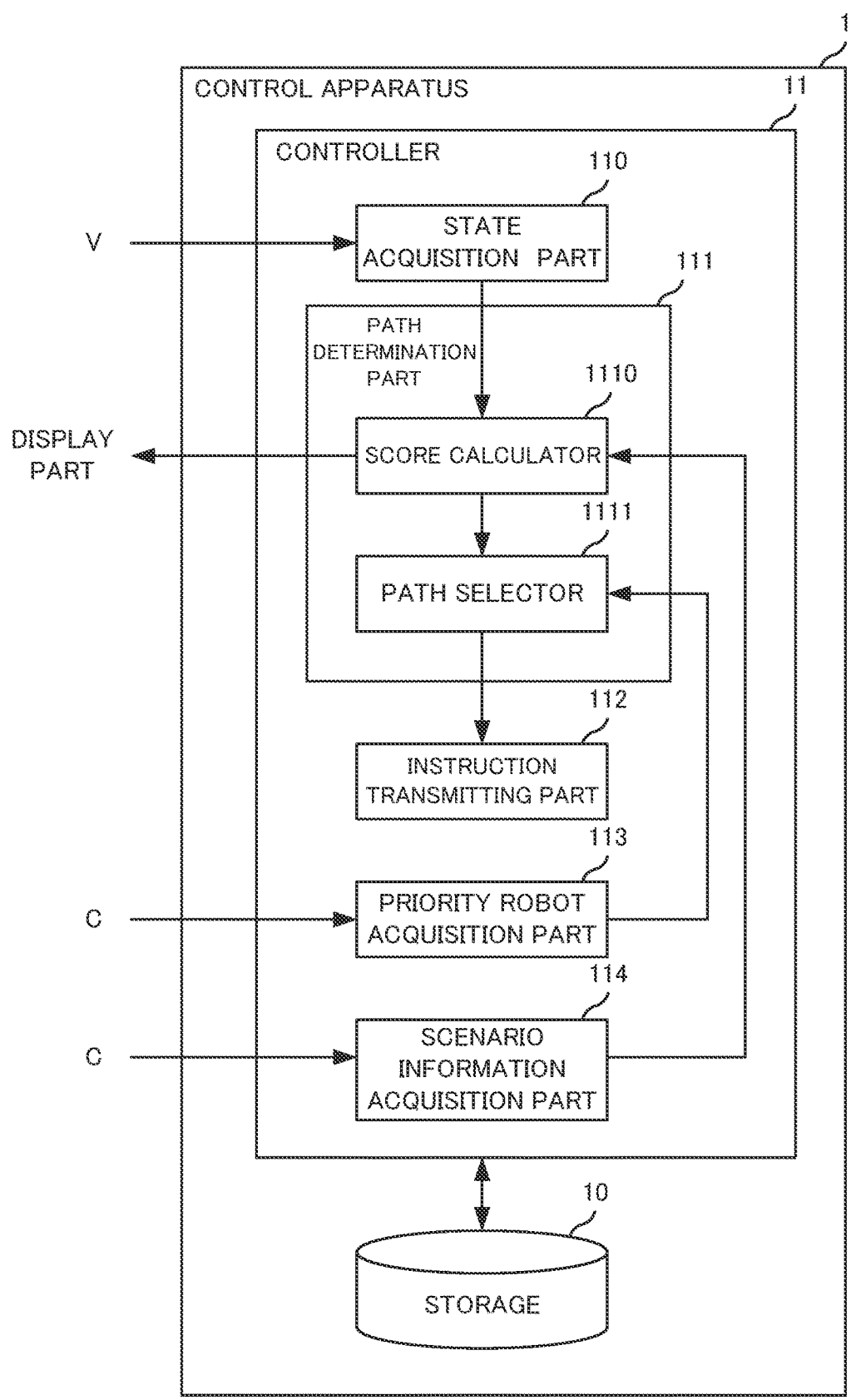
FIG. 4 schematically shows a functional configuration of a control apparatus according to the first embodiment.

FIG. 4 schematically shows a functional configuration of the control apparatus 1 according to the first embodiment. The control apparatus 1 includes a storage 10 and a controller 11. In FIG. 4, arrows indicate a major flow of data, and there may be flows of data not shown in FIG. 4. In FIG. 4, each functional block indicates not a configuration of a hardware (apparatus) unit but a configuration of a functional unit. Therefore, the functional blocks shown in FIG. 4 may be implemented in a single apparatus, or may be implemented separately in a plurality of devices. The exchange of data among the functional blocks may be performed through any means such as a data bus, a network, or a portable storage medium. Further, FIG. 4 illustrates only functional blocks related to control of the communication path between the operating device C and the slave robot R, and a function of converting capture information into an operation signal and a function of converting sensor information into a presentation signal are omitted in FIG. 4.

The storage 10 is a mass storage device such as a Read Only Memory (ROM) for storing a Basic Input Output System (BIOS) and the like of a computer that implements the control apparatus 1, a Random Access Memory (RAM) for a work area of the control apparatus 1, a Hard Disk Drive (HDD) and a Solid State Drive (SSD) for storing various pieces of information including an Operating System (OS) and an application program, and various databases referenced when executing the application program.

The controller 11 is a processor such as a Central Processing Unit (CPU) or a Graphics Processing Unit (GPU) of the control apparatus, and functions as a state acquisition part 110, a path determination part 111, an instruction transmitting part 112, a priority robot acquisition part 113, and a scenario information acquisition part 114 by executing a program stored in the storage 10.

It should be noted that FIG. 4 shows an example in which the control apparatus 1 is constituted by a single apparatus. However, the control apparatus 1 may be implemented by a computing resource such as a plurality of processors and memories like a cloud computing system, for example. In this case, each unit formed by the controller 11 is implemented by executing the program with at least any processor among a plurality of different processors.

The state acquisition part 110 repeatedly acquires status reports respectively from the operating device C, a plurality of slave robots R, and a plurality of virtual routers V while the communication between the operating device C and the plurality of slave robots R is established. Here, the status report of a virtual router V is a measured value used to estimate communication quality of each device constituting the communication path connecting the operating device C and the slave robot R, or a statistic calculated on the basis of the measured value. It should be noted that the details of the status report of the virtual router V will be described later.

Further, there are status reports of the operating device C and the slave robot R. The status report of the operating device C is information indicating the size of the above-described capture information and operating condition of the presentation device 2. The status report of the slave robot R is information indicating the size of the above-described sensor information and operating condition of various actuators and sensors 3 included in the slave robot. Hereinafter, in the present specification, if no distinction is being made among the status report of the virtual router V, the status report of the operating device C, and the status report of the slave robot R, they are simply described as "status reports."

When the state acquisition part 110 acquires status reports, the path determination part 111 determines a communication path for transmitting a control instruction, which is an operation signal for controlling the motion of the slave robot R, to the plurality of slave robots R on the basis of the acquired status report. More specifically, the path determination part 111 selects a virtual router V for forming a communication path between the operating device C and the slave robot R on the basis of the status reports acquired by the state acquisition part 110.

The instruction transmitting part 112 transmits an instruction for forming the communication path determined by the path determination part 111 to each of the plurality of virtual routers V forming the communication path. Each virtual router V sets a virtual switch in accordance with the instruction received from the control apparatus 1, thereby establishing a communication path.

The control apparatus 1 continues performing the acquisition of status reports and a determination process of the communication path on the basis of the acquired status reports while the communication between the operating device C and the slave robot R is established. This allows the control apparatus 1 to change the communication path appropriately so as to improve communication quality if the communication quality of the communication path between the operating device C and the slave robot R is impaired while the communication between the operating device C and the slave robot R is established. As a result, the control apparatus 1 can maintain a bit rate and a data amount of streaming data between the operating device C and the slave robot R in the telexistence system S.

As shown in FIG. 3, in the telexistence system S according to the first embodiment, there may be a plurality of slave robots R for one operating device C. Therefore, the operator U may simultaneously operate a plurality of slave robots R using the operating device C depending on a task executed by the operator U. In this case, the control apparatus 1 needs to transmit the operation signal of the slave robot R generated on the basis of the capture information to the plurality of slave robots R.

Therefore, the path determination part 111 determines, from among the plurality of virtual routers V, a virtual router V for multicasting a control instruction in order to transmit the control instruction for controlling the motion of the slave robot R to the plurality of slave robots R. This allows the control apparatus 1 to transmit the operation signal for controlling the motion of the slave robot R to the plurality of slave robots R.

The operating device C worn by the operator U presents sensations such as vision, hearing, and touch to the operator U in accordance with a tactile presentation signal generated on the basis of sensor information acquired and streamed by each sensor provided to the slave robot R. Since there may be a plurality of slave robots R for one operating device C in the telexistence system S according to the first embodiment, in such a case, the problem is which sensor information acquired by each sensor provided to the slave robot R should be used for the control apparatus 1 to generate a tactile presentation signal.

Therefore, when the telexistence system S includes the plurality of slave robots R, the priority robot acquisition part 113 acquires priority robot information for identifying a priority robot, which is a slave robot that transmits streaming data to the operating device C, from among the plurality of slave robots R. The path determination part 111 determines a virtual router that discards streaming data transmitted by slave robots R other than the priority robot from the plurality of virtual routers V. Thus, only the presentation signal based on the information acquired by the sensor 3 provided to the priority robot is transmitted to the operating device C worn by the operator U.

Next, a path determination process executed by the path determination part 111 will be described in detail. As shown in FIG. 4, the path determination part 11 includes a score calculator 1110 and a path selector 1111. The score calculator 1110 calculates a score indicating the communication capability of each communication path on the basis of the status reports acquired by the state acquisition part 110 for each candidate for the plurality of communication paths connecting the operating device C and the slave robot R.

The path selector 1111 selects a candidate for a communication path whose calculated score indicates the communication capability is high as a communication path connecting the operating device C and the slave robot R with priority over a candidate for a communication path whose calculated score indicates the communication capability is low. This allows the path selector 1111 to select a communication path having relatively good communication quality on the basis of status reports of devices constituting the respective plurality of communication paths connecting the operating device C and the slave robot R.

As described above, the status reports acquired by the state acquisition part 110 include measured values used to estimate the communication quality of each device constituting the communication path connecting the operating device C and the slave robot R, or a statistic calculated on the basis of the measured values. Specifically, the status reports acquired by the state acquisition part 110 include at least a statistic respectively related to bandwidth, latency, jitter, a packet loss rate, a packet rearrangement rate, and an error correction rate related to the communication between the operating device C and the slave robot R. The score calculator 1110 calculates a score on the basis of these statistics acquired by the state acquisition part 110 as status reports.

FIG. 5 shows a list of statistics acquired by the state acquisition part 110 according to the first embodiment. As shown in FIG. 5, the statistics acquired by the state acquisition part 110 include a maximum value, a minimum value, and an average value for each item of bandwidth, latency, jitter, a packet loss rate, a packet rearrangement rate, and an error correction rate.

The score calculator 1110 calculates a score RS indicating the communication capability of each communication path in accordance with the following equation (1).

[Equation 1]

$$RS = \sum_{each\ statistic} \left( \left| \frac{average - minimum}{maximum - minimum} \right| \times weighting\ factor \right) \quad (1)$$

As shown in equation (1), the score calculator 1110 calculates a value by multiplying a value, which is obtained by normalizing the difference between the average value and the minimum value with the difference between the maximum value and the minimum value for each item, by a weighting factor that is different for each item, and calculates the total sum of the calculated values as a score RS. The "weighting factor" is a positive real number value indicating a contribution rate of each item toward the score RS.

The designer of the telexistence system S may determine the weighting factor by an experiment, considering an operation purpose of the slave robot R, for example. Therefore, the scenario information acquisition part 114 acquires operation scenario information indicating the purpose of operating the slave robot R using the operating device C. The scenario information is information indicating the purpose of the operator U using the telexistence system S such as "virtual travel," "taking inventory in a store," and "working in a danger zone." When the operation purpose of the telexistence system S is determined, the scenario information acquisition part 114 reads and acquires the operation scenario information stored in the storage 10 in advance. In a case where the telexistence system S is a general-purpose system and an operation scenario differs for each use, the scenario information acquisition part 114 acquires the operation scenario information from the operator U of the telexistence system S via a user interface (not shown in figures).

FIG. 6 schematically shows a data structure of a weighting factor database that stores the scenario information and the weighting factor in association with each other. The weighting factor database is stored in the storage 10 and managed by the score calculator 1110. The score calculator 1110 refers to the weighting factor database and changes the weighting factor for each operation scenario on the basis of the operation scenario information acquired by the scenario information acquisition part 114. This allows the path selector 1111 to appropriately select a communication path according to the purpose of the operator U using the telexistence system S.

It should be noted that when the calculated score RS exceeds a predetermined threshold, the score calculator 1110 may display information indicating that communication state is good on a display part of the control apparatus 1. When the display part of the control apparatus 1 is a monitor, the score calculator 1110 displays a character string such as "communication state: good" on the display part, for example. Alternatively, when the control apparatus 1 includes a Light Emitting Diode (LED) indicating the quality of the communication state, the score calculator 1110 may cause the LED to emit green light to indicate that the communication state is good.

Further, when the calculated score RS is equal to or less than a predetermined threshold, the score calculator 1110 may display information indicating that the communication state is poor on the display part of the control apparatus 1. When the display part of the control apparatus 1 is a monitor, the score calculator 1110 displays a character string such as "communication state: poor" on the display part, for example. Alternatively, when the control apparatus 1 includes an LED indicating the quality of the communication state, the score calculator 1110 may cause the LED to emit red light to indicate that the communication state is poor.

Further, when the score RS in a plurality of communication paths is equal to or less than a threshold, the score calculator 1110 may notify the administrator of the control apparatus 1 by causing the LED to blink or changing the size and color of the font displayed on the display part.

Thus, the path selector 1111 selects a communication path on the basis of the score RS calculated by the score calculator 1110. More specifically, when the score RS related to another communication path becomes larger than the score RS related to the currently selected communication path, the path selector 1111 selects this other communication path as a new communication path.

Here, the path selector 1111 may provide a hysteresis to the score RS referred to when selecting a communication path, so as to maintain the communication path. More specifically, the path selector 1111 may determine a predetermined value indicating a dead zone, and may select another communication path as a new communication path when a value obtained by adding a predetermined value to the score RS related to this other communication path becomes larger than the score RS related to the currently selected communication path. This makes it possible to suppress the occurrence of hunting (frequent change)

accompanying the selection of the communication path by the path selector 1111 while the operator U operates the slave robot R.

Alternatively, the path selector 1111 may provide a standby period for switching the selected communication path to another communication path. Thus, it is at least possible to prevent an interval between the switching of the communication paths from becoming shorter than the standby period. Further, the path selector 1111 may change the standby period at the time of switching the communication path on the basis of the length of the score RS at the time of selecting the communication path. Specifically, the path selector 1111 may lengthen the standby period at the time of switching the communication path as the score RS at the time of selecting the communication path becomes larger. Accordingly, the larger the score RS calculated by the score calculator 1110 is, the longer the standby period becomes, and hunting accompanying the selection of the communication path can be more effectively prevented.

<A Process Flow of a Control Method of a Communication Path Executed by the Control Apparatus 1>

Figure 7:
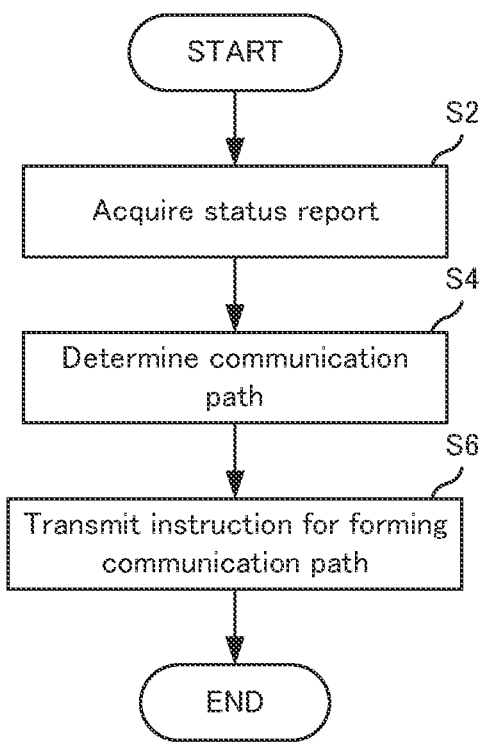
FIG. 7 is a flowchart for explaining a flow of a control process of a communication path executed by the control apparatus according to the first embodiment.

FIG. 7 is a flowchart for explaining a flow of a control process of a communication path executed by the control apparatus 1 according to the first embodiment. The process in this flowchart starts when the control apparatus 1 has been activated, for example.

The state acquisition part 110 acquires status reports respectively from the operating device C, one or a plurality of slave robots R, and a plurality of virtual routers V included in the telexistence system S (S2). When the state acquisition part 110 acquires the status reports, the path determination part 111 determines a communication path for transmitting a control instruction for controlling the motion of the slave robot R to the one or the plurality of slave robots R on the basis of the status reports acquired by the state acquisition part 110 (S4).

The instruction transmitting part 112 transmits an instruction for forming the determined communication path to each of the plurality of virtual routers V (S6). The control apparatus 1 repeatedly executes the above-described process while the communication between the operating device C and the one or the plurality of slave robots R is established. Thus, a bit rate and a data amount of streaming data can be maintained in the telexistence system S.

<Effects of the Control Apparatus 1 According to the First Embodiment>

As described above, according to the control apparatus 1 according to the first embodiment, the bit rate and the data amount of the streaming data can be maintained in the telexistence system S. Further, in the telexistence system S in which a plurality of slave robots R exist for one operating device C, only a presentation signal based on information acquired by the sensor 3 provided to a priority robot, which is a slave robot transmitting the streaming data to the operating device C, can be transmitted to the operating device C.

A Second Embodiment

Differing from the telexistence system S according to the first embodiment, the telexistence system S according to the second embodiment includes only one slave robot but includes a plurality of operating devices C. Hereinafter, the telexistence system S according to the second embodiment will be described, but portions common to the first embodiment will be appropriately omitted or simplified.

<An Outline of the Telexistence System S According to the Second Embodiment>

The telexistence system S according to the second embodiment is a system used when one slave robot R is controlled by a plurality of operating devices C.

Figure 8:
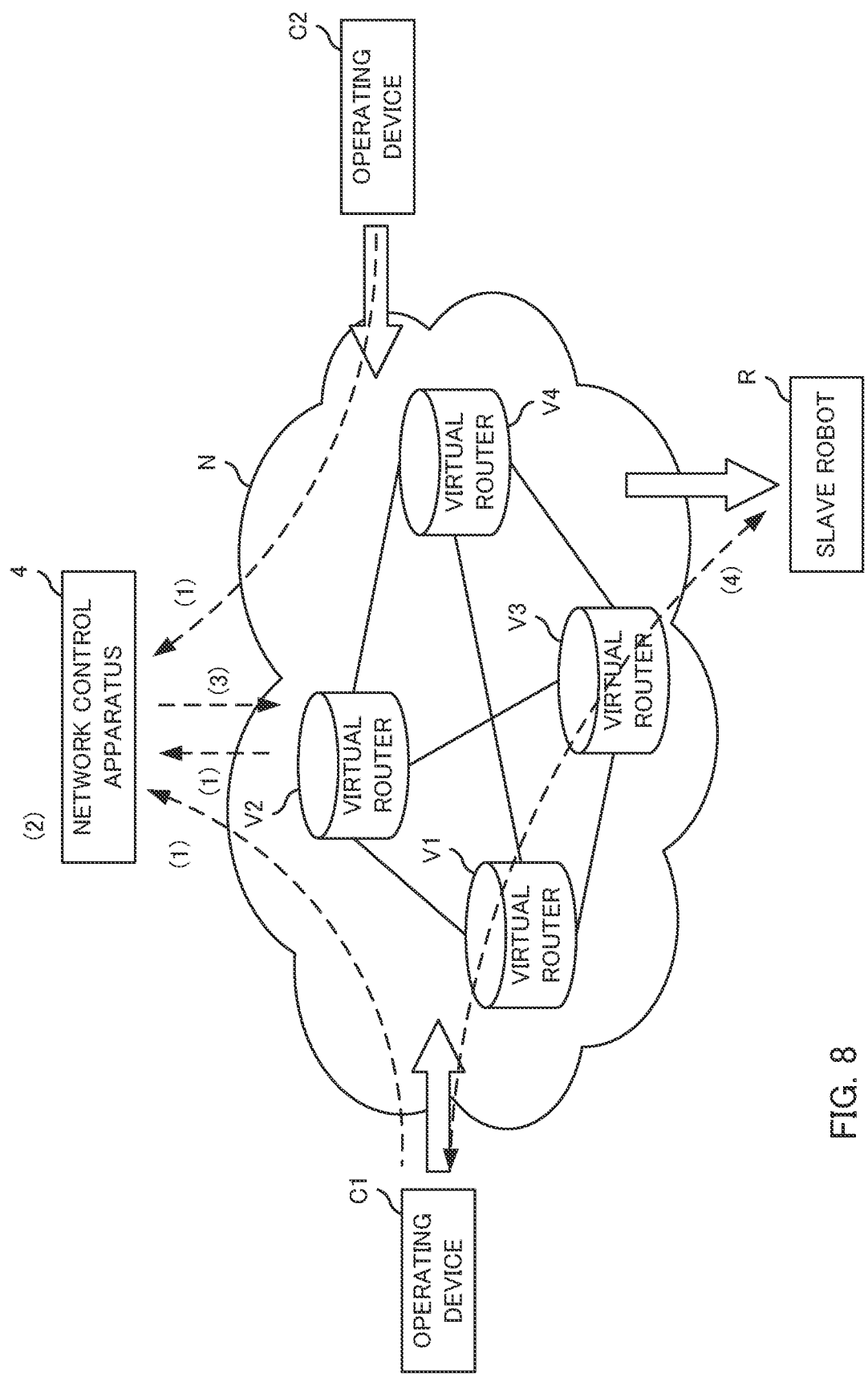
FIG. 8 is for explaining an outline of the telexistence system according to a second embodiment.

FIG. 8 is for explaining an outline of the telexistence system S according to the second embodiment. The telexistence system S shown in FIG. 8 includes i) a plurality of operating devices C, ii) one slave robot R whose motion is controlled by any one of the plurality of operating devices C, and iii) a plurality of virtual routers V for forming a communication path for transmitting information between the plurality of operating devices C and the slave robot R. It should be noted that FIG. 8 shows only two operating devices C (a first operating device C1 and a second operating device C2) for convenience of illustration, but the number of operating devices C may be three or more. Similarly, although FIG. 8 shows four virtual routers V (a first virtual router V1, a second virtual router V2, a third virtual router V3, and a fourth virtual router V4), the number of virtual routers V is not limited to four.

The control apparatus 4 controls communication between the plurality of operating devices C and the slave robot R. The control apparatus 4 controls communication between the slave robot R and the plurality of operating devices C by controlling the operation of the virtual router V. For example, suppose that after a communication path is established between the operating device C and the slave robot R by the virtual router V, the communication quality of the communication path is impaired for some reason. In this case, the control apparatus 4 changes the communication path by controlling the virtual router V to improve the communication quality between the operating device C and the slave robot R. As another example, when the operator U of the second operating device C2 transmits, to the control apparatus 4, an instruction indicating transition from a state where the slave robot R is controlled by the first operating device C1 to a state where the slave robot R is controlled by the second operating device C2, the control apparatus 4 cuts off the communication path between the first operating device C1 and the slave robot R by controlling the virtual router V, and establishes a communication path between the second operating device C2 and the slave robot R.

As described above, in the telexistence system S according to the second embodiment, the control apparatus 4 changes the communication path between the operating device C and the slave robot R by controlling the virtual router V. As a result, the operating device C and the slave robot R in the telexistence system S can communicate with each other while maintaining values of specific items such as a bit rate and a data amount of streaming data at a predetermined value or more. Further, the control apparatus 4 can freely switch the operating device C for operating the slave robot R.

<A Functional Configuration of the Control Apparatus 4 According to the Second Embodiment>

Figure 9:
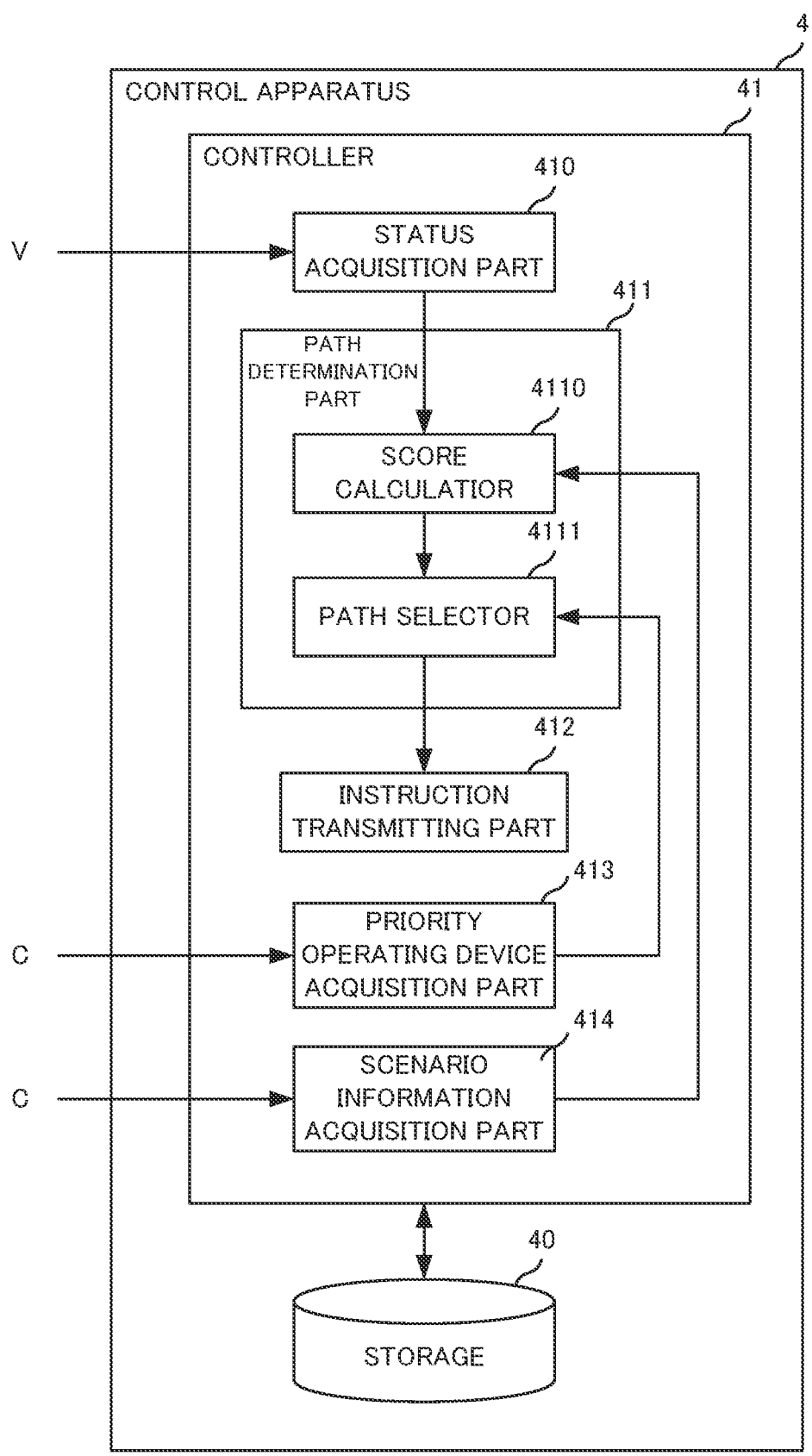
FIG. 9 schematically shows a functional configuration of the control apparatus according to the second embodiment.

FIG. 9 schematically shows a functional configuration of the control apparatus 4 according to the second embodiment. The control apparatus 4 includes a storage 40 and a controller 41. In FIG. 9, arrows indicate a major flow of data, and there may be flows of data not shown in FIG. 9. In FIG. 9, each functional block indicates not a configuration of a hardware (apparatus) unit but a configuration of a functional unit. Therefore, the functional blocks shown in FIG. 9 may be implemented in a single apparatus, or may be implemented separately in a plurality of devices. The exchange of data among the functional blocks may be performed through any means such as a data bus, a network, or a portable storage medium. Further, FIG. 9 illustrates only functional blocks related to control of a communication path between the operating device C and the slave robot R, and a function of converting capture information into an operation signal and a function of converting sensor information into a presentation signal are omitted in FIG. 9.

The storage 40 is a mass storage device such as a ROM for storing a BIOS and the like of a computer that implements the control apparatus 4, a RAM for a work area of the control apparatus 4, an HDD and an SSD for storing various pieces of information including an OS and an application program, and various databases referenced when executing the application program.

The controller 41 is a processor such as a CPU or a GPU of the control apparatus 4, and functions as a state acquisition part 410, a path determination part 411, an instruction transmitting part 412, a priority operating device acquisition part 413, and a scenario information acquisition part 414 by executing a program stored in the storage 40.

It should be noted that FIG. 9 shows an example in which the control apparatus 4 is constituted by a single apparatus. However, the control apparatus 4 may be implemented by a computing resource such as a plurality of processors and memories like a cloud computing system, for example. In this case, each unit included by the controller 41 is implemented by executing a program with at least any processor among a plurality of different processors.

The priority operating device acquisition part 413 identifies a priority operating device, which is an operating device C for controlling the motion of the slave robot R, from a plurality of operating devices C included in the telexistence system S. In one scenario, the priority operating device is changed according to a predetermined schedule, for example. In another scenario, the last operating device C online becomes the priority operating device. In still another scenario, when an operating device C with higher authority goes online, said operating device C becomes the priority operating device. Thus, the way of determining the priority operating device varies depending on the purpose of operating the slave robot R, and there are various modes other than the above-described example.

The state acquisition part 410 repeatedly acquires status reports respectively from the plurality of operating devices C, the slave robot R, and the plurality of virtual routers V while communication between the plurality of operating devices C and the slave robot R is established.

When the state acquisition part 410 acquires the status reports, the path determination part 411 determines a communication path for transmitting a control instruction for controlling the motion of the slave robot R to the slave robot R on the basis of the acquired status reports and priority operation information indicating the priority operating device. Specifically, the path determination part 411 determines a communication path connecting the operating device C, which is the priority operating device, and the slave robot R.

The instruction transmitting part 412 transmits an instruction for forming the communication path determined by the path determination part 411 to each of the plurality of virtual routers V. Thus, in the telexistence system S in which a plurality of operating devices C capable of operating one slave robot R exist, the control apparatus 4 can prevent simultaneous transmission of a plurality of control instructions derived from different operating devices C to one slave robot R.

On the other hand, it is convenient if a plurality of operating devices C can share the sensor information acquired by the sensor 3 provided to one slave robot R. For example, in a case where the telexistence system S is used for a virtual travel, it is assumed that a presentation signal based on information acquired by the sensor 3 of one slave robot R located in a tourist spot is transmitted to a plurality of presentation devices 2 worn by a respective plurality of operators U participating in the virtual travel. In this case, the priority operating device is, but not limited to, an operating device C provided to a tour conductor of the virtual travel, and the participants of the virtual travel can see the video captured by the imaging element 3a of the slave robot R located in the tourist spot or hear the audio collected by the microphone 3c using the operating devices C respectively worn.

In order to realize this, the path determination part 411 determines, from among the plurality of virtual routers V, a virtual router V for multicasting streaming data to transmit streaming data transmitted by the slave robot R to the plurality of operating devices C. This allows the control apparatus 4 to transmit a presentation signal based on the sensor information acquired by the slave robot R to the plurality of operating devices C.

As described above, the priority operating device may change during the operation of the telexistence system S (a state where the slave robot R is operated by a certain operating device C) according to the second embodiment. Therefore, when the priority operating device acquisition part 413 acquires new priority operating device information, the path determination part 411 re-determines a communication path. As a result, the control apparatus 4 can flexibly switch the priority operating device without interrupting the operation of the slave robot R by the first operating device C1 and the second operating device C2.

<A Process Flow of a Control Method of a Communication Path Executed by the Control Apparatus 4>

Figure 10:
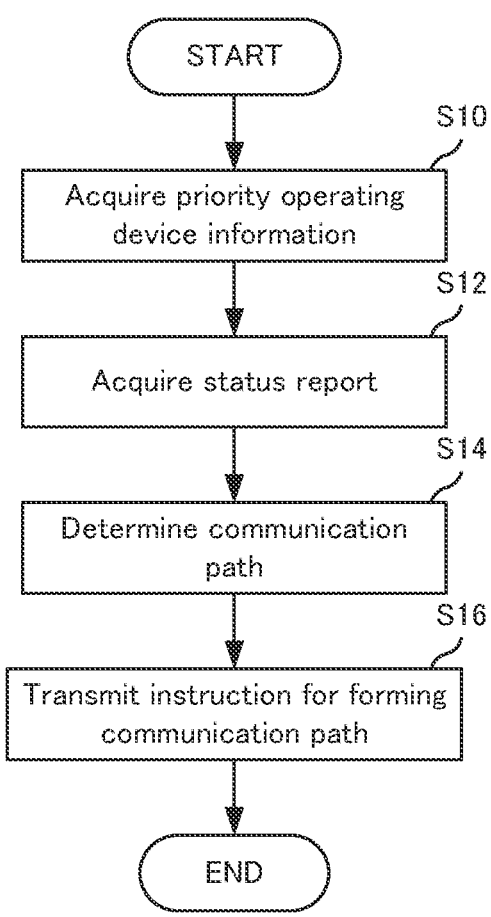
FIG. 10 is a flowchart for explaining a flow of a control process of a communication path executed by the control apparatus according to the second embodiment.

FIG. 10 is a flowchart for explaining a flow of a control process of a communication path executed by the control apparatus 4 according to the second embodiment. The process in this flowchart starts when the control apparatus 4 has been activated, for example.

The priority operating device acquisition part 413 acquires priority operating device information for identifying a priority operating device, which is an operating device for controlling the motion of the slave robot R, from among the plurality of operating devices C included in the telexistence system S (S10).

The state acquisition part 410 acquires status reports respectively from the plurality of operating devices C, the slave robot R, and the plurality of virtual routers V (S12). When the state acquisition part 410 acquires the status reports, the path determination part 411 determines a communication path for transmitting a control instruction for controlling the motion of the slave robot R to the slave robot R on the basis of the acquired status reports and the priority operating device information (S14).

The instruction transmitting part 412 transmits an instruction for forming the communication path determined by the path determination part 411 to each of the plurality of virtual routers V. The control apparatus 4 repeatedly executes the above-described process while the communication between the plurality of operating devices C and the slave robot R is established.

It should be noted that the functions of the score calculator 4110, the path selector 4111, and the scenario information acquisition part 414 are the same as those of the score calculator 1110, the path selector 1111, and the scenario information acquisition part 114 according to the first embodiment, respectively, and therefore the description thereof will be omitted.

<Effects of the Control Apparatus 4 According to the Second Embodiment>

As described above, according to the control apparatus 4 according to the second embodiment, communication can be performed while values of specific items are maintained at predetermined values or more in the operation of the telexistence system S. Further, in the telexistence system S in which a plurality of operating devices C exist for one slave robot R, only control signals derived from a priority operating device capable of transmitting an operation signal to the slave robot R can be transmitted to the slave robot R.

The present invention is explained on the basis of the first embodiment and the second embodiment. The technical scope of the present invention is not limited to the scope explained in the above embodiments and it is possible to make various changes and modifications within the scope of the invention. For example, all or part of the apparatus can be configured to be functionally or physically distributed and integrated in arbitrary units. Further, new exemplary embodiments generated by arbitrary combinations of them are included in the exemplary embodiments of the present invention. The effect of the new embodiment caused by the combination has the effect of the original embodiment together.

<A First Variation>

In the above description, the telexistence system S including a plurality of slave robots R for one operating device C and the telexistence system S including a plurality of operating devices C for one slave robot R have been described. However, the telexistence system S may include a plurality of operating devices C and a plurality of slave robots R.

A priority robot according to the first embodiment and a priority operating device according to the second embodiment exist in this telexistence system S. In this case, the motion of each slave robot R is controlled by the priority operating device selected from the plurality of operating devices C, and presentation signals of each operating device C are generated on the basis of the sensor information acquired by the sensor 3 of the priority robot selected from the plurality of slave robots R. Thus, it is possible to control a plurality of slave robots R for work while a plurality of operators U take turns, for example.

A Second Variation

In the above description, a case where the control apparatus 1 has a function of generating an operation signal from capture information, a function of generating a presentation signal from sensor information, and a function of controlling a virtual router V on the basis of status reports has been described. However, it is not necessary for one control apparatus 1 to be provided with all of these functions, and each function may be shared by a plurality of devices. One server may have a function of generating an operation signal from capture information and a function of generating a presentation signal from sensor information, and another server may have a function of controlling a virtual router V, for example. In this case, the former case is, so to speak, an operating device/robot control device, and the latter case is, so to speak, a network control device. This is effective in that load distribution can be realized for each function to operate the telexistence system S.

A Third Variation

In the above description, a communication path is selected on the basis of a score RS calculated by the score calculator 1110 or the score calculator 4110. Alternatively or additionally, an operation mode of the slave robot R may be changed depending on the magnitude of the score RS.

Specifically, the control apparatus according to the third variation includes an operation mode changer (not shown in figures). When the calculated score RS does not reach a predetermined reference value, the operation mode changer sets an automatic operation mode in which the slave robot R is automatically operated. In the automatic operation mode, the slave robot R operates automatically when the operation signal is not transmitted from the operating device C provided to the operator U. When the operation signal is transmitted from the operating device C provided to the operator U, the slave robot R operates in accordance with the operation signal. Thus, even if a situation in which the operation signal does not reach the slave robot R due to the deterioration of the communication state of the communication path arises, it is possible to prevent a problem caused by the stoppage of the slave robot R.

It should be noted that when the calculated score RS exceeds the predetermined reference, the operation mode changer sets the slave robot R to a manual operation mode. Thus, when the communication state of the communication path is good, the slave robot R can be operated under the control of the operator U.

What is claimed is:

1. A control apparatus for controlling communication between an operating device and one or a plurality of slave robots in a telexistence system including the one or the plurality of slave robots, one operating device for controlling the motion of the one or the plurality of slave robots, and a plurality of virtual routers for forming a communication path for transmitting information between the operating device and the one or the plurality of slave robots, the control apparatus comprising:

a state acquisition part that repeatedly acquires status reports respectively from the operating device, the one or the plurality of slave robots, and the plurality of virtual routers while communication between the operating device and the one or the plurality of slave robots is established;

a path determination part that determines a communication path for transmitting a control instruction for controlling the motion of the one or the plurality of slave robots to the one or the plurality of slave robots on the basis of the acquired status reports when the state acquisition part acquires the status reports; and an instruction transmitting part that transmits an instruction for forming the communication path determined by the path determination part to each of the plurality of virtual routers, wherein the path determination part includes:
    a score calculator that calculates a score indicating a communication capability of each communication path for each candidate for a plurality of communication paths connecting the operating device and the one or the plurality of slave robots on the basis of the status reports, and
    a path selector that selects a candidate for the communication path with the score calculated by the score calculator indicating that the communication capability is high as the communication path connecting the operating device and the one or the plurality of slave robots with priority over a candidate for the communication path with the score calculated by the score calculator indicating that the communication capability is low, the status reports include at least a statistic related to each of a bandwidth, a latency, a jitter, a packet loss rate, a packet rearrangement rate, and an error correction rate related to communication between the operating device and the one or the plurality of slave robots, and the score calculator calculates the score on the basis of the statistic related to each of the bandwidth, the latency, the jitter, the packet loss rate, the packet rearrangement rate, and the error correction rate related to communication between the operating device and the one or the plurality of slave robots, the statistic includes a maximum value, a minimum value, and an average value for each item of the bandwidth, the latency, the jitter, the packet loss rate, the packet rearrangement rate, and the error correction rate, the score calculator calculates a value by multiplying a value, which is obtained by normalizing a difference between the average value and the minimum value with a difference between the maximum value and the minimum value for each item, by a weighting factor that is different for each item, and calculates a total sum of the calculated values as the score, and the control apparatus further comprises a scenario information acquisition part that acquires operation scenario information indicating a purpose of operating the one or the plurality of slave robots using the operating device, wherein the score calculator changes the weighting factor on the basis of the operation scenario information.

2. The control apparatus according to claim 1, wherein the path determination part determines, from among the plurality of virtual routers, a virtual router for multicasting the control instruction to transmit the control instruction to the one or the plurality of slave robots.

3. The control apparatus according to claim 1, further comprising
a priority robot acquisition part that acquires priority robot information for identifying a priority robot, which is a slave robot that transmits streaming data to the operating device, from a plurality of slave robots, wherein the telexistence system includes the plurality of slave robots.

4. A control apparatus for controlling communication between a plurality of operating devices and one slave robot in a telexistence system including the plurality of operating devices, the slave robot whose motion is controlled by any one of the plurality of operating devices, and a plurality of virtual routers for forming a communication path for transmitting information between the plurality of the operating devices and the slave robot, the control apparatus comprising:

a priority operating device acquisition part that acquires priority operating device information for identifying a priority operating device which is an operating device for controlling the motion of the slave robot, from among the plurality of operating devices;

a state acquisition part that repeatedly acquires status reports respectively from the plurality of operating devices, the slave robot, and the plurality of virtual routers while communication between the plurality of operating devices and the slave robot is established;

a path determination part that determines a communication path for transmitting a control instruction for controlling the motion of the slave robot to the slave robot on the basis of the acquired status reports and the priority operating device information when the state acquisition part acquires the status reports; and an instruction transmitting part that transmits an instruction for forming a communication path determined by the path determination part to each of the plurality of virtual routers, wherein the path determination part includes:
a score calculator that calculates a score indicating the communication capability of each communication path for each candidate for a plurality of communication paths connecting the priority operating device and the slave robot on the basis of the status reports, and a path selector that selects a candidate for the communication path with the score calculated by the score calculator indicating that the communication capability is high as the communication path connecting the priority operating device and the slave robot with priority over a candidate for the communication path with the score calculated by the score calculator indicating that the communication capability is low, the status reports include at least a statistic related to each of a bandwidth, a latency, a jitter, a packet loss rate, a packet rearrangement rate, and an error correction rate related to communication between the priority operating device and the slave robot, and the score calculator calculates the score on the basis of the statistic related to each of the bandwidth, the latency, the jitter, the packet loss rate, the packet rearrangement rate, and the error correction rate related to communication between the priority operating device and the slave robot, the statistic includes a maximum value, a minimum value, and an average value for each item of the bandwidth, the latency, the jitter, the packet loss rate, the packet rearrangement rate, and the error correction rate, the score calculator calculates a value by multiplying a value, which is obtained by normalizing a difference between the average value and the minimum value with a difference between the maximum value and the minimum value for each item, by a weighting factor that is different for each item, and calculates a total sum of the calculated values as the score, and the control apparatus further comprises a scenario information acquisition part that acquires operation scenario information indicating a purpose of operating the slave robot using the priority operating device, wherein the score calculator changes the weighting factor on the basis of the operation scenario information.

5. The control apparatus according to claim 4, wherein the path determination part determines, from among the plurality of virtual routers, a virtual router for multicasting streaming data transmitted by the slave robot to the plurality of operating devices.

6. The control apparatus according to claim 4, wherein the path determination part re-determines a communication path when the priority operating device acquisition part acquires new priority operating device information.

7. A network control method performed by a processor of a control apparatus that controls communication between one operating device and one or a plurality of slave robots in a telexistence system including the one or the plurality of slave robots, the operating device for controlling the motion of the one or the plurality of slave robots, and a plurality of virtual routers for forming a communication path for transmitting information between the operating device and the one or the plurality of slave robots, the method comprising:

repeatedly acquiring status reports respectively from the operating device, the one or the plurality of slave robots, and the plurality of virtual routers while communication between the operating device and the one or the plurality of slave robots is established;

determining a communication path for transmitting a control instruction for controlling the motion of the one or the plurality of slave robots to the one or the plurality of slave robots on the basis of the acquired status reports when acquiring the status reports; and transmitting an instruction for forming the determined communication path to each of the plurality of virtual routers, wherein the determining further includes:

calculating a score indicating a communication capability of each communication path for each candidate for a plurality of communication paths connecting the operating device and the one or the plurality of slave robots on the basis of the status reports, and selecting a candidate for the communication path with the score indicating that the communication capability is high as the communication path connecting the operating device and the one or the plurality of slave robots with priority over a candidate for the communication path with the score indicating that the communication capability is low, the status reports include at least a statistic related to each of a bandwidth, a latency, a jitter, a packet loss rate, a packet rearrangement rate, and an error correction rate related to communication between the operating device and the one or the plurality of slave robots, and the calculating further includes to calculate the score on the basis of the statistic related to each of the bandwidth, the latency, the jitter, the packet loss rate, the packet rearrangement rate, and the error correction rate related to communication between the operating device and the one or the plurality of slave robots, the statistic includes a maximum value, a minimum value, and an average value for each item of the bandwidth, the latency, the jitter, the packet loss rate, the packet rearrangement rate, and the error correction rate, the calculating further includes calculating a value by multiplying a value, which is obtained by normalizing a difference between the average value and the minimum value with a difference between the maximum value and the minimum value for each item, by a weighting factor that is different for each item, and calculating a total sum of the calculated values as the score, and the method further comprising acquiring operation scenario information indicating a purpose of operating the one or the plurality of slave robots using the operating device, wherein the calculating further includes to change the weighting factor on the basis of the operation scenario information.

8. A network control method performed by a processor of a control apparatus that controls communication between a plurality of operating devices and one slave robot in a telexistence system including the plurality of operating devices, the slave robot whose motion is controlled by any one of the plurality of operating devices, and a plurality of virtual routers for forming a communication path for transmitting information between the plurality of operating devices and the slave robot, the method comprising:

acquiring priority operating device information that identifies a priority operating device, which is an operating device for controlling the motion of the slave robot, from among the plurality of operating devices;

repeatedly acquiring status reports respectively from the plurality of operating devices, the slave robots, and the plurality of virtual routers while communication between the plurality of operating devices and the slave robot is established;

determining a communication path for transmitting a control instruction for controlling the motion of the slave robot to the slave robot on the basis of the acquired status reports and the priority operating device information when acquiring the status reports; and transmitting an instruction for forming the determined communication path to each of the plurality of virtual routers, wherein the determining further includes:

calculating a score indicating the communication capability of each communication path for each candidate for a plurality of communication paths connecting the priority operating device and the slave robot on the basis of the status reports, and selecting a candidate for the communication path with the score indicating that the communication capability is high as the communication path connecting the priority operating device and the slave robot with priority over a candidate for the communication path with the score indicating that the communication capability is low, the status reports include at least a statistic related to each of a bandwidth, a latency, a jitter, a packet loss rate, a packet rearrangement rate, and an error correction rate related to communication between the priority operating device and the slave robot, and the calculating further includes to calculate the score on the basis of the statistic related to each of the bandwidth, the latency, the jitter, the packet loss rate, the packet rearrangement rate, and the error correction rate related to communication between the priority operating device and the slave robot, the statistic includes a maximum value, a minimum value, and an average value for each item of the bandwidth, the latency, the jitter, the packet loss rate, the packet rearrangement rate, and the error correction rate, and the calculating further includes calculating a value by multiplying a value, which is obtained by normalizing a difference between the average value and the minimum value with a difference between the maximum value and the minimum value for each item, by a weighting factor that is different for each item, and calculating a total sum of the calculated values as the score, and the method further comprises acquiring operation scenario information indicating a purpose of operating the slave robot using the priority operating device, wherein the calculating further includes to change the weighting factor on the basis of the operation scenario information.

* * * * *